April 28, 1925.
J. G. CLEVELAND ET AL
1,535,717
WINDOW GLASS APPARATUS
Filed March 24, 1923    4 Sheets-Sheet 2
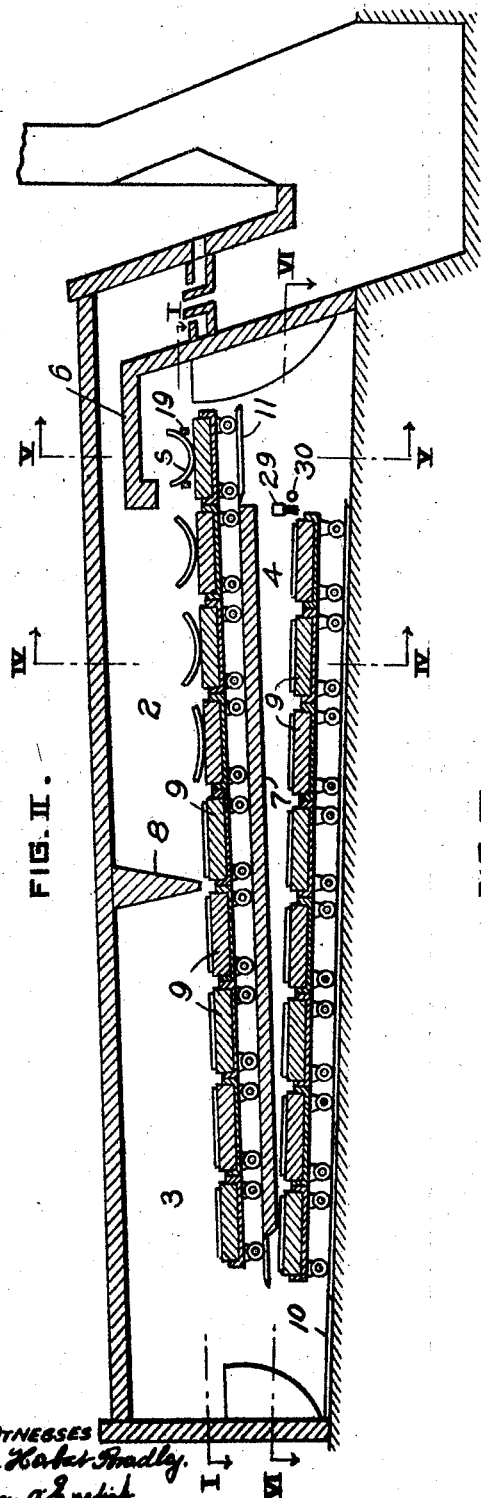
FIG. II.
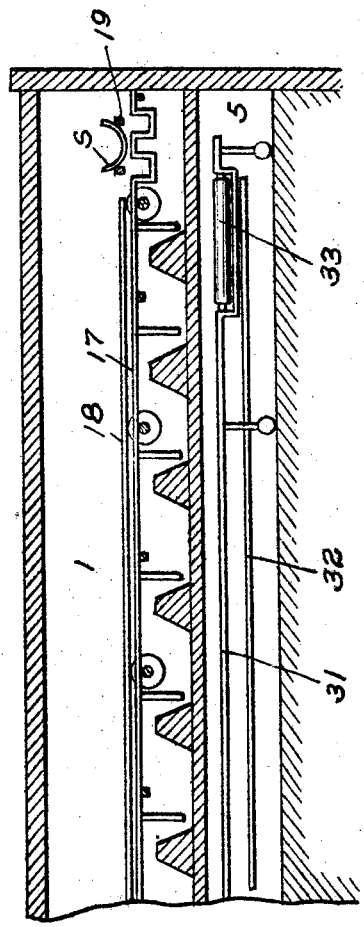
FIG. III.
INVENTORS
James G. Cleveland and
Harvey L. Keller
by Christy and Christy
their attorneys April 28, 1925.
J. G. CLEVELAND ET AL
1,535,717
WINDOW GLASS APPARATUS
Filed March 24, 1923
4 Sheets-Sheet 3
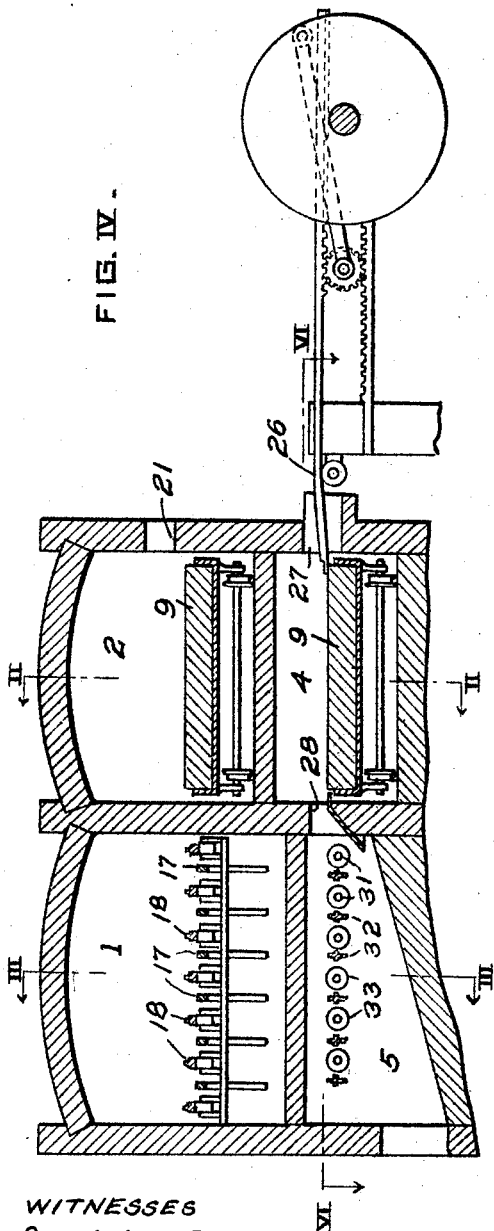
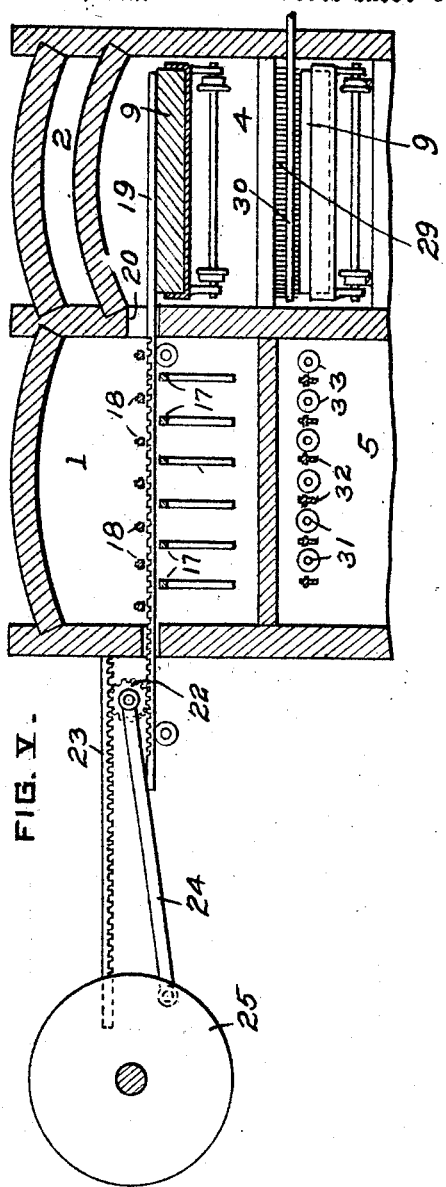
WITNESSES
INVENTORS
James G. Cleveland and
Harvey L. Keller
by Christy and Christy
their attorneys April 28, 1925.
J. G. CLEVELAND ET AL
1,535,717
WINDOW GLASS APPARATUS
Filed March 24, 1923 4 Sheets-Sheet 4
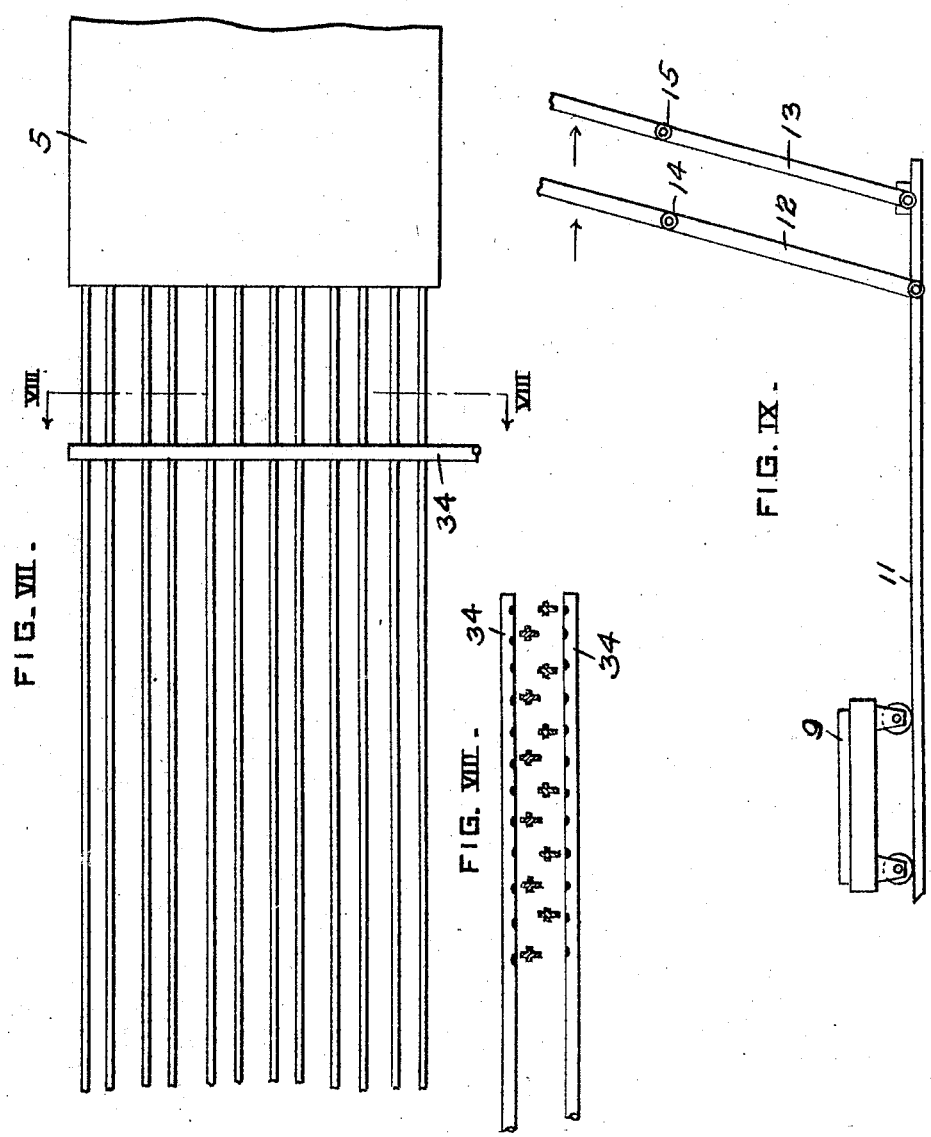
WITNESSES
INVENTORS
James G. Cleveland and
Harvey L. Keller
by Christy and Christy
their attorneys Patented Apr. 28, 1925.

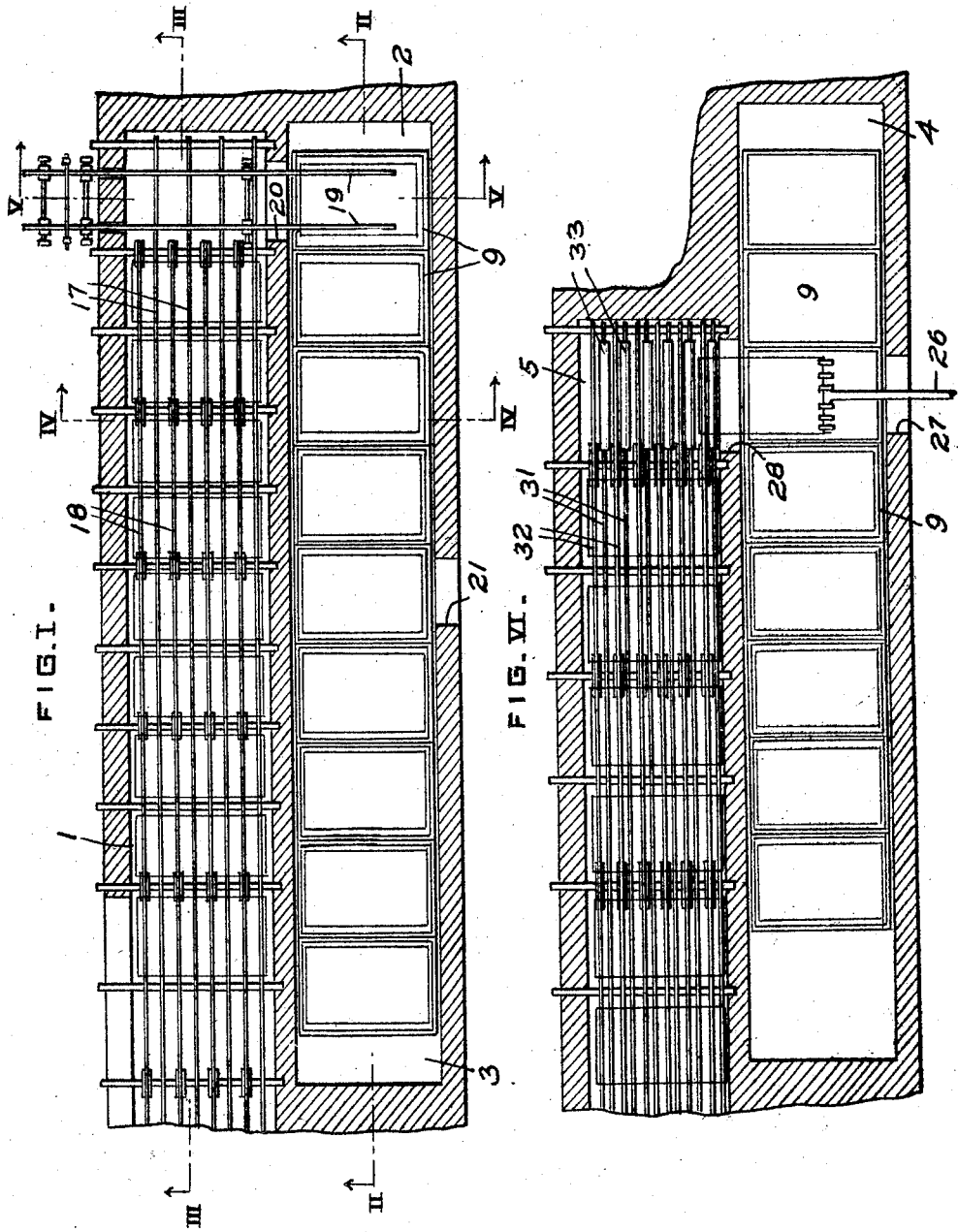

1,535,717

UNITED STATES PATENT OFFICE.

JAMES G. CLEVELAND AND HARVEY L. KELLER, OF ARNOLD, PENNSYLVANIA.

WINDOW-GLASS APPARATUS.

Application filed March 24, 1923. Serial No. 627,466.

*To all whom it may concern:*

Be it known that we, JAMES G. CLEVELAND and HARVEY L. KELLER, residing at Arnold, in the county of Westmoreland and State of Pennsylvania, citizens of the United States, have invented or discovered certain new and useful Improvements in Window-Glass Apparatus, of which improvements the following is a specification.

Our invention relates to improvements in apparatus for flattening and annealing window glass. The objects of invention are increase in capacity of such apparatus, elimination of a large part of the manual attention hitherto necessarily involved in the operation of such apparatus, and simplification of the manual attention still required, reduction of damage and breakage, and improvement in average quality.

Apparatus embodying our invention is shown in the accompanying drawings. Fig. I is a view in horizontal section, approximately on the plane indicated by the line I—I, Fig. II. Fig. II is a view in vertical and longitudinal section, on the plane indicated by the line II—II, Fig. I, and by the line II—II, Fig. IV. Fig. III is a view in vertical and longitudinal section, on the plane indicated at III—III, in Figs. I and IV. Figs. IV and V are views in transverse vertical section on the planes indicated at IV—IV and V—V, respectively, in Figs. I and II. Fig. VI is a view in horizontal section, approximately on the plane indicated at VI—VI, Figs. II and IV. Fig. VII is a plan view from above of the discharge end of the leer. Fig. VIII is a view in vertical section, on the plane indicated at VIII—VIII, Fig. VII. Fig. IX is a somewhat diagrammatic showing of a detail of mechanical operation.

The apparatus includes a shawl receiving chamber 1, a flattening chamber 2, a transfer chamber, which for reasons which presently will appear is built as two chambers 3 and 4, and a leer chamber 5. These several chambers are by suitable means heated to proper temperatures. Maximum temperature is maintained in flattening chamber 2, where the glass is softened and altered in shape, and here means of heating are indicated. In Fig. II a burner structure is shown on the right, and from it, when the apparatus is in operation, a flame sweeps chamber 2, from right to left, that is to say, in the direction in which articles under treatment advance. Fig. II shows also, within chamber 2, an arch 6, shielding the newly entering articles from immediate and direct impingement of the flame upon them.

The temperature within chamber 2 being the maximum attained, and being within a narrow range fixed and pre-determined, temperature throughout the elongate shawl-receiving chamber is so graded that an entering shawl is brought gradually from its initially cold state to a temperature approximating that within the flattening chamber 2. Beyond the flattening chamber 2, the glass must be maintained at elevated temperature, and yet at a certain rate be gradually cooled, until it comes again to atmospheric temperatue. This is the annealing operation, and, accordingly all of the succeeding chambers through which the glass advances, beyond the flattening chamber 2, are, functionally considered, annealing chambers. The leer 5 is essentially the leer familiar to the art, and the transfer chambers 3 and 4 are chambers within which the glass is cooled sufficiently to allow of its movement in charging into the leer, and within which suitable charging mechanism may operate.

Chambers 2, 3, and 4 are built within suitable approximately rectangular walls of masonry. The space within is divided by a horizontal screen 7 and, above this, by the curtain arch 8. The subdivision is such that proper conveyance of the glass and of the glass-carrying apparatus, from chamber to chamber is permitted, as presently will be explained; but here we are concerned to note these features consequent upon the particular form and arrangement of chambers 2, 3, and 4: first, that chambers 3 and 4 partially surround chamber 2, and so there is economy of floor space and economy of heat; second, that the sides of this assembly of chambers 2, 3 and 4 are accessible, so that the shawl-receiving chamber 1 and the leer 5 may be built one above the other, both in side to side abutment with the chamber assembly 2, 3, 4. The chamber 1 and the leer 5 may be superposed, chamber 1 above, leer 5 beneath, and so transfer mechanism may be freely applied. Third, there is free access through the wall of flattening chamber 2 for the necessary introduction and manipulation of tools to complete flattening.

The structure is in fact a furnace, incompletely subdivided by internal partitions 7 and 8 into chambers 2, 3, and 4. Heating is by flame introduced immediately into chamber 2, and within that chamber 2 the heating effect is chiefly confined. The chambers 3 and 4 in which to a limited extent the hot gases circulate are chambers within which the article heated in chamber 2 grows cooler. Of course the structure admits of auxiliary heating at any desired point.

The course of progress of the articles under treatment will readily be followed. Beginning at the left hand end of chamber 1 as seen in Fig. I, the articles advance from left to right, until they come to the extreme right-hand end of Fig. I. They then are transferred in a direction at right angles to their initial course, downward as seen in Fig. I, to the right-hand end of chamber 2. Having so entered chamber 2, the articles advance from right to left through chamber 2 and then in uninterrupted course through chamber 3. Turning to Fig. II, the articles, when they have reached the left-hand end of chamber 3 are carried vertically downward from chamber 3 and into chamber 4. Within chamber 4 they advance from left to right, until they come opposite the wall opening through which they are transferred to the leer. Turning to Fig. VI they are transferred, again in right-angled course from chamber 4, upward, as seen in Fig. VI, into leer 5, and within leer 5 their progress is from right to left.

Window glass is blown, and, in the present-day industry, is blown by machinery, into cylinders approximately twenty-five to forty feet long and two to three feet in diameter. The newly blown cylinders are first cut (or otherwise divided) into cylinder sections approximately four to six feet long, and then the cylinder sections are cut longitudinally into half cylinders. The half-cylinder section is called a shawl, and the further operation involves flattening the shawl to a level sheet, and annealing the sheet when flattened. The shawl is placed, convex face downward upon a flattening stone and heated until the glass becomes plastic again, whereupon the shawl spreads by gravity and rests upon the plane upper face of the stone. An attendant then completes flattening by rubbing with a wooden block the upper surface of the sheet.

The flattening operation as now conducted is relatively slow, much skilled attention is required, and loss in breakage and in damaged and disfigured glass is considerable. The flattening stones are grouped four together upon a turn-table. Curtain partitions divide the space above into two quadrant chambers and a semi-circular chamber. One quadrant chamber is the flattening chamber. An attendant is requird, by the careful manipulation of the instrumentalities provided, to raise a shawl from its supports in a feeding chamber, invert it, and place it upon the stone in the flattening chamber. The attendant then presently has to manipulate the block which completes and perfects flattening upon the stone. By table rotation the stone bearing the flattened sheet advances to the next quadrant chamber, which is an annealing chamber, in that there the decline of temperature begins. So also is the semi-circular chamber into which by table rotation the stone with the sheet upon it next comes. When the sheet has come into this semi-circular chamber, the same attendant who has introduced the shawl and smoothed the sheet now lifts the sheet from the stone and then deposits it on a conveyor by which it is borne into a leer. Conditions are necessarily such that breakage is frequent, stones cannot be cleaned perfectly, and the sheets are in the course of operation liable to disfigurement.

Turning to the apparatus in which our invention is embodied, and first to Fig. II, we maintain within the communicating chambers 2, 3, and 4, a relatively great number of flattening stones, 9. The precise number of stones is not important; we show seventeen. These stones are mounted, each on a car adapted to run on tracks. The chambers 2, 3, and 4 have inclined floors, the floor of chambers 2 and 3 is inclined in continuity downwardly from the intake end of chamber 2, and the floor of chamber 4 is oppositely inclined. The cars carrying the stones 9 roll under gravity downward upon tracks laid upon these chamber floors. The horizontal partition 7 leaves at its ends passageways for vertical movement of the cars from chamber to chamber; and the arch 8 approaches partition 7, with sufficient space between to allow the advance of the cars beneath. Track sections 10 and 11 are movable up and down, to make alternate continuity with the upper and lower tracks.

Means for raising and lowering the track sections are diagrammatically illustrated in Fig. IX. The track section 11 is shown in elevation with a car resting upon it. To this track section pairs of levers 12 and 13 are pivoted, and these levers are fulcrumed on properly spaced centers of turning 14 and 15. As these levers are turned clockwise on their fulcra the parallelogram formed by them and the rail section collapses, after the manner in which lazy-tongs collapse, and in so doing shifts the track section at the right-hand end (Fig. II) from continuity with the lower to continuity with the upper fixed tracks. (It is shown in Fig. II in the latter position.) Similarly the track section 10 may be shifted. And of course any suitable means of elevating and lowering may be employed.

The stone at the upper right end of chamber 2 (Figure II) receives the shawl and it travels with its car from right to left, through chambers 2 and 3 in turn, and so comes to rest upon track section 10, then elevated. Track section 10 is lowered, until it makes continuity with the lower track, and then the stone bearing the now flattened sheet travels upon the lower tracks from left to right, until it comes to the point of discharge to the leer.

We remark again that the progress of the flattening stones through the chambers 2 and 3 is in straight-away course. This is an arrangement which leaves the chambers 2 and 4 accessible along the sides, for charging and discharging and for manual attention.

Turning to Figs. I, III, IV, and V, the intake chamber 1 will be found to be provided with conveyor mechanism for sustaining the shawls as they are introduced and for feeding them gradually forward, from left to right, Fig. I. This conveyor mechanism may assume any preferred form. We show it to consist essentially of sets of vertically reciprocable fingers 17 and horizontally reciprocable fingers 18. These fingers move alternately set by set, and their paths cross one another; and they by cooperative movement and in well-known manner advance the material which they bear gradually through the chamber from end to end. The shawls are introduced by laying them cold (when they can easily be handled) convex side down, upon the conveyor within chamber 1, and at the intake end of the chamber (the left end, Fig. I), and they are laid upon the conveyor in position of transverse extent within the chamber.

At the extreme end of the course through chamber 1 (the right-hand end, Figs. I and III) the descending fingers 17 at last leave the advanced shawl S resting upon a pair of fingers 19. This pair of fingers 19 is by suitable automatically operating mechanism caused to advance and recede in a direction transverse to the line of shawl advance through chamber 1, and in so doing it carries the shawl resting upon it through an opening 20 in the dividing wall, and into the flattening chamber 2.

As shown in Fig. II, the point within chamber 2, to which the fingers 19 advancing, carry shawl S is precisely the point to which the flattening stones rise from their lower to their upper course, at the right. The fingers 19 are so proportioned and spaced that, when on the descent of fingers 17 a shawl is left in their support, its convex lower face will extend below the plane of the lower faces of the fingers. This being so, it will be perceived that, by careful proportioning, the rising stone 9 will engage the shawl medially and raise it from fingers 19. Fingers 19 are then free, and recede, and thereafter the stone which has raised the shawl from fingers 19 continues to carry it. This is accomplished automatically.

We have said that fingers 19 are at proper times caused to advance and recede by suitable automatically operating mechanism. Such mechanism is shown in Fig. V. A gear wheel 22 is in mesh between parallel racks. One rack 23 is stationary; the other is formed upon or is integral with fingers 19. Gear wheel 22 turns freely upon a pitman 24 which at its opposite end is pivoted to crank wheel 25. As the wheel is turned one way or the other, the fingers 19 are thrust forward, and drawn back again, at double the speed and through double the distance attainable by pivoting the fingers to the pitman direct.

Turning back to Fig. III, it remains only to remark that the vertically reciprocable fingers 17 at their right-hand ends are recessed, to allow the interaction described, between them and fingers 19.

The heating in chamber 1 is so performed that the shawl as it enters chamber 2 is hottest midway its curved extent. When then in chamber 2 the temperature is increased, the glass of which the shawl is composed softens first in this medial portion, and the shawl spreads by gravity upon the stone. This automatic spreading is of course assisted, in that the stone itself is of heat-absorbing and heat-radiating material. When the shawl has so softened and spread itself upon the stone, it remains only to complete the flattening, by rubbing the flattened sheet with a block introduced and manipulated through the opening 21 in the chamber wall, and so smoothing it.

Turning to Figs. IV and VI, similarly as the shawls are carried one by one from chamber 1 to chamber 2, the flattened and sufficiently cooled sheets are mechanically pushed from chamber 4 into leer 5. As here shown the discharging apparatus operates upon the sheets as the cars stand in the third position from the last in the range of left to right advance in chamber 4. The cars being stationary at the time, the pusher 26, driven as fingers 19 are driven, advancing through an opening 27 in the chamber wall, engages the rim of the sheet and pushes it from the stone upon which it has been flattened and upon which it has since become somewhat cooler and hardened, through an opposite wall opening 28 into the leer chamber 5. Fig. VI shows the pusher in the act of so transferring the sheet.

After the stone has so given up the sheet which it has carried, it is in position where it may by suitable means be swept and cleaned, and so freed of particles of glass or foreign material which being present might mar the surface of sheets subsequently flattened upon it. In Fig. II are indicated a brush 29 and a pipe 30 for an air blast, beneath which the advancing stone may be cleaned.

Within the leer again is suitable conveyor apparatus. I have shown apparatus essentially such as that described to be present in chamber 1. It consists of sets of vertically reciprocable rods or fingers 31 and horizontally reciprocable fingers 32, reciprocating in alternation and in paths which cross one another. The vertically reciprocable rods are, at the ends opposite opening 28, equipped with rollers 33, to facilitate the transfer of the sheets from chamber 4 to leer chamber 5.

Beyond the exit end of the leer, pipes 34 are arranged above and below to throw jets of acidulated hot water upon the opposite surfaces of the sheet of glass to give it a clear and lustrous appearance.

The operation has been explained. The sequence of steps is this: the shawl is laid cold, convex surface down, upon the conveyor fingers at the intake end of chamber 1. The shawl is automatically carried through chamber 1 and heated as it advances. The shawl comes at length to rest upon fingers 19 at the extreme end of chamber 1. The fingers then advance and carry the shawl through wall opening 20 and into flattening chamber 2. A stone 9 rising engages the shawl and raises it free of fingers 19, whereupon the fingers recede. The shawl resting upon stone 9, advances through chamber 2. It there spreads and is flattened and smoothed. It then advances through chambers 3 and 4 in turn, until it comes opposite wall opening 28. Through this opening it is pushed out, and so is introduced into the leer. There it undergoes the usual annealing operation; or, to speak more precisely, there the annealing operation is in usual manner completed. As the finished sheet emerges from the leer it is washed with acidulated water at suitable temperature.

We have in the course of the specification indicated that the particular instrumentalities employed are merely preferred instrumentalities for the particular purposes. It will be understood that our invention in its application is not limited to the employment of such accessory appliances.

We claim as our invention:

1. In window-glass flattening apparatus the combination of an intake chamber a furnace chamber and a leer chamber, the said chambers being straight-walled and arranged in parallelism and the intake chamber and the leer chamber overlapping the furnace chamber and communicating therewith through lateral openings, said intake chamber and said furnace chamber being provided each with a conveyor mechanism, and a pair of fingers extensible and retractible transversely across intake chamber and furnace chamber and through the communicating opening between the said chambers, said fingers adapted to receive from the conveyor mechanism in the intake chamber a shawl, and to transfer the shawl through the communicating opening and into the furnace chamber, and there to deliver the shawl to the conveyor mechanism therein, substantially as described.

2. In window glass flattening apparatus the combination of an intake chamber, a furnace chamber and a leer chamber, the said chambers being straight-walled and arranged in parallelism and the intake chamber and the leer chamber overlapping the furnace chamber and communicating therewith through lateral openings, and the said intake chamber and the said leer chamber being arranged vertically one above the other.

3. In window-glass flattening apparatus a furnace chamber subdivided internally into upper and nether chambers with oppositely inclined floors and communicating vertically at the ends, the upper chamber being further subdivided into higher and lower chambers communicating adjacent the floor, a car bearing a flattening stone adapted to move by gravity through the said chambers, means at opposite ends for moving a car vertically between upper and nether chambers, and means for introducing a flame into the higher of the two upper chambers.

4. In window-glass flattening apparatus a furnace chamber subdivided internally into upper and nether chambers with oppositely inclined floors and communicating vertically at the ends, the upper chamber being further subdivided into higher and lower chambers communicating adjacent the floor, a car bearing a flattening stone adapted to move by gravity through the said chambers, means at opposite ends for moving a car vertically between upper and nether chambers, and means for introducing a flame into the higher of the two upper chambers, the wall of the higher upper chamber being provided with an intake opening and an opening for introduction of a flattening block, and the wall of the lower chamber being provided with a discharge opening.

5. In window-glass flattening apparatus a furnace chamber subdivided internally into upper and nether chambers, communicating vertically at their ends, the upper chamber being further subdivided into flattening and transfer chambers, means for maintaining within the flattening chamber a maximum temperature, higher than in the transfer chamber or in the nether chamber, a flattening stone, means for causing the flattening stone to advance through the flattening chamber, from flattening chamber to transfer chamber, thence to the nether chamber, through the nether chamber, and thence to and through the flattening chamber again and means for introducing a shawl through the wall of the flattening chamber and into the pathway of advance of the flattening stone through said flattening chamber.

In testimony whereof we have hereto set our hands.

JAMES G. CLEVELAND.
HARVEY L. KELLER.

Witnesses:
BAYARD H. CHRISTY,
PERCY A. ENGLISH.